United States Patent [19]

Muelling

[11] 4,232,472
[45] Nov. 11, 1980

[54] ANIMAL TRAP

[75] Inventor: Earl L. Muelling, Fairmont, Minn.

[73] Assignee: The Earl Enterprises, Inc., Fairmont, Minn.

[21] Appl. No.: 25,470

[22] Filed: Mar. 30, 1979

Related U.S. Application Data

[63] Continuation-in-part of Ser. No. 879,258, Feb. 21, 1978, abandoned.

[51] Int. Cl.$^3$ ............................................. A01M 23/02
[52] U.S. Cl. ............................................. 43/61; 43/67
[58] Field of Search .................. 43/60, 61, 67, 69, 70

[56] References Cited

U.S. PATENT DOCUMENTS

| | | | |
|---|---|---|---|
| 730,434 | 6/1903 | Bowen | 43/67 |
| 1,191,027 | 7/1916 | Nessa | 43/61 |
| 1,415,301 | 5/1922 | Bounds et al. | 43/67 |
| 2,562,809 | 7/1951 | Mogren | 43/61 |
| 3,823,504 | 7/1974 | Dosch | 43/61 |
| 3,918,194 | 11/1975 | Waske | 43/61 |
| 3,975,857 | 8/1976 | Branson et al. | 43/61 |

FOREIGN PATENT DOCUMENTS 1400301 7/1975 United Kingdom ................. 43/61

*Primary Examiner*—Othell M. Simpson
*Assistant Examiner*—J. T. Zatarga

*Attorney, Agent, or Firm*—Orrin M. Haugen; Thomas J. Nikolai

[57] ABSTRACT

An improved animal trap in which the animal may be made to expire due to hypercapnia rather than through impact or trauma. The trap includes a generally air-tight enclosure having the shape of a hollow prismoid defined by a relatively long, rectangular, bottom wall, a relatively short rectangular wall of a width equal to that of the bottom wall, a rear wall exending perpendicularly to the bottom wall at one end edge thereof and joined to the top wall at a corresponding end edge thereof, and first and second side walls in the form of a four-sided irregular polygon, there being an obliquely extending door opening at the end of the enclosure opposite to the rear wall. A door member is provided which is pivotally mounted proximate the door opening and is biased to assume a normally closed, sealing relationship with respect to the door opening. The door is adapted to be propped open by means of a latch member. A first class lever is pivotally arranged within the enclosure and it has a bait receiving area proximate the end wall. When an animal enters the enclosure and advances towards the bait, the lever tips under the weight of the animal to release the latch and allow the door to snap closed. A guard device is affixed to the lever which prevents the animal from interfering with the proper release of the latch mechanism.

4 Claims, 4 Drawing Figures

ANIMAL TRAP

CROSS-REFERENCE TO RELATED APPLICATION

This is a continuation-in-part application of Ser. No. 879,258, filed Feb. 21, 1978 and entitled "Animal Trap", now abandoned.

BACKGROUND OF THE INVENTION

I. Field of the Invention

This invention relates generally to the design of an improved animal trap, and more specifically to a design which permits simplicity of manufacture, reliability of operation and sanitary handling.

II. Description of the Prior Art

The closest art of which I am aware is that set forth in th Branson et al U.S. Pat. No. 3,975,857. That device comprises a housing defining an enclosure having a door opening, and a door hinged to the housing for closing the opening. Sealing means are provided around the door to provide an air-tight seal within the housing when the door is closed. The door is held open by a trip mechanism, and it is urged closed by a spring or weight. The trip mechanism is actuated by a rodent, and causes the door to slam shut, thereby trapping and suffocating the rodent. The trip mechanism of the Branson et al Patent includes a door prop having one end connected to the hinged door and having a shoulder formed in its other end for normally engaging an abutment member attached to the housing so as to hold the door in its open position. A treadle platform is pivotally mounted inside the housing, and is adapted to hold the bait at one end. A trip lever has one end connected to the treadle platform and its other end adjacent the door prop member, so that activation of the treadle platform causes the trip lever to move the door prop member off the abutment member, thereby causing the door to close.

The chief advantage of the trap device disclosed in the Branson et al Patent is the fact that it is highly sanitary. Once the rodent enters the trap and springs it, the rodent remains within the sealed enclosure until it is disposed of. Decomposition does not produce offensive odors and flying insects are unable to reach and dead rodent and potentially spread infection and disease.

The present invention embodies many of the features of the prior art rodent trap mentioned above, but is considered to be a substantial advance and improvement over that arrangement. For example, the housing or enclosure of the present invention is shaped as a prismoid whereas the enclosure of the prior art Branson et al Patent is generally rectangular. It has been found that the prism effect obtained with the enclosure of the present invention provides an illusion of greater depth and is thus believed to offer a less threatening environment to a small animal such as a rodent. As such, experience and testing has shown that mice and rats are more prone to enter the trap having the prismoidal shaped housing than is true with the arrangement disclosed in the prior art Branson et al Patent.

Also, because the top member of the enclosure slopes downward from front to rear while the treadle platform, when the trap is set, slopes upward from front to rear, the trap of the present invention is able to snare small and lightweight rodents in that even if their weight is insufficient to trip the door supporting latch, the wedging of their body into the area of the bait zone will produce the requisite downward force on the treadle member to cause the trap to spring.

SUMMARY OF THE INVENTION

According to a first aspect of the present invention, an animal trap is provided having a housing defining a generally prismoidal shaped hollow enclosure with an obliquely extending door opening at one end thereof. A door member is pivotally secured to the housing to completely seal the door opening in substantially airtight fashion when the door is in a first orientation and to permit the entry of an animal into the housing when the door is in its second orientation. A resilient means, such as a spring or elastic band, is coupled between the door member and the housing for normally urging the door member to its first orientation. Further included is a latch member which is pivotally secured to the door and which has first and second notches located along its length which are adapted to engage an abutment which extends inwardly into the housing from one side of the enclosure. When the first notch on the latch member engages the abutment, the door is held in the open orientation and when the second notch on the latch engages the abutment, the door is positively held in a locked, closed condition.

Positioned within the housing and proximate the floor thereof is an elongated platform which is pivoted about a fulcrum as a lever of the first class. A trip member is attached to the platform ahead of the pivot and is arranged to engage the latch member when the inward end of the platform is rotated downward toward the bottom member of the housing. The tipping of the platform member releases the first notch in the latch member from its engagement with the abutment and permits the resilient means to snap the door shut. The relationship between the trip member, the latch and the abutment is such that the door cannot be propped to its open orientation against the force of the resilient means when the treadle or platform is in its "sprung" orientation. Also, when the trap is sprung, the second notch in the latch member engages the abutment and securely locks the door in the closed position to thereby prevent unintended release of the animal after it is contained within the sealed housing. A semicircular plate element is disposed on the treadle proximate the trip member so as to prevent the animal from interfering with the proper operation of the latch mechanism.

OBJECTS

It is accordingly a principal object of the present invention to provide a new and improved animal trap for small animals.

Another object of the invention is to provide an improved design of a trap which causes death of the caught animal due to suffocation.

Still another object of the invention is to provide the design of an animal trap housing which optically appears to have a longer length dimension than it really has.

Still another object of the invention is to provide the design of an animal trap which is easy to manufacture and which incorporates snap-together construction of several of its operable elements.

Yet still another object of the invention is to provide the design of a trap which is easy to clean and bait, due to the fact that the treadle or platform is removable from the housing.

An additional object is to provide the design of a rodent trap in which small, lightweight rodents will still cause actuation of the trip member as they attempt to position their heads in proximity to the bait location on the treadle.

These and other objects and advantages of the invention will become more apparent to those skilled in the art from the following detailed description of the preferred embodiment when considered in conjunction with the accompanying drawings in which like numerals in the several views refer to corresponding parts.

DESCRIPTION OF THE PREFERRED EMBODIMENT

Figure 1:
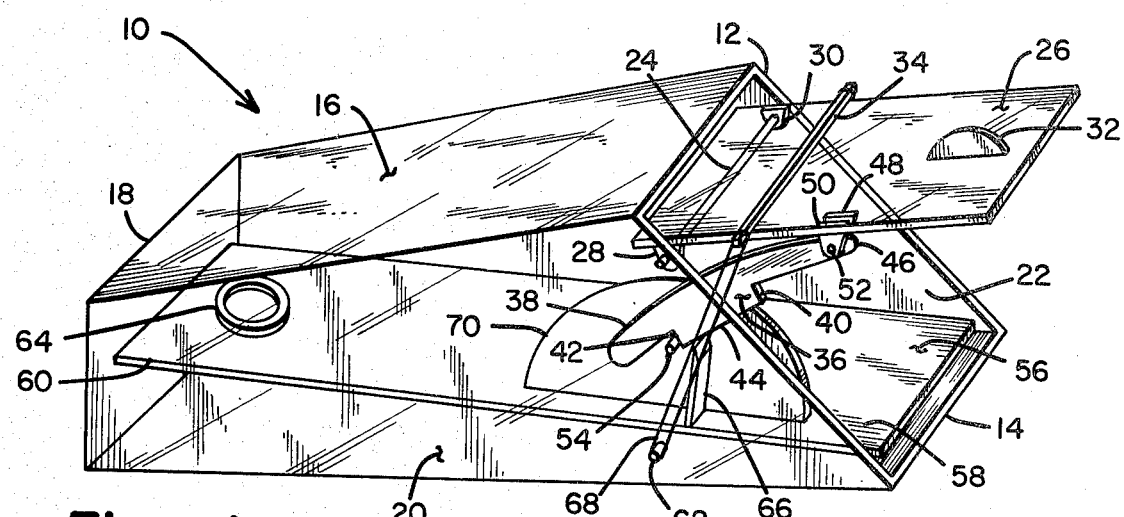
FIG. 1 is a perspective view of the preferred embodiment.

Referring first to FIG. 1, there is indicated generally by numeral 10 the animal trap of the present invention. The trap comprises an enclosure or housing 12 having a generally rectangular bottom wall 14 of a predetermined length and a generally rectangular top wall 16 of a length which is less than that of the bottom wall 14. Extending perpendicular to the bottom wall 14 at its left end edge as viewed in FIG. 1 is a generally rectangular end wall 18. The end wall 18 joins the leftmost end edge of the top wall 16 as illustrated. The enclosure 12 further includes two generally parallel and spaced apart side walls 20 and 22. The side walls are in the form of a four-sided irregular polygon such that the top wall 16 slopes downwardly to the end wall 18 and the rightmost edges of the wall members 14, 16, 20 and 22 define a door opening which extends obliquely from the forward edge of the bottom wall 14 to the forward edge of the slanted top wall 16.

A hinge pin 24 extends between the side walls 20 and 22, the pin being generally parallel to the plane of the bottom wall 14. As is indicated in FIG. 1, the hinge pin 24 is located proximate the door opening. A door member 26 of a length and width sufficient to completely seal the door opening is rotatably coupled to the hinge pin 24. More specifically, on the underside of the door member 26 are located first and second orthogonally projecting ears 28 and 30 having an aperture therethrough and a slit leading to the aperture. As such, the door member 26 may be snapped onto the hinge pin 24 by forcing the pin through the slit in the ears 28 and 30 so that the pin resides in the central aperture.

For convenience, a handle 32 is affixed to the outside surface of the door 26 so that it can be conveniently grasped by the thumb and forefinger of the user. Also affixed to the outer surface of the door member 26 is a transversely extending bar 34 which projects at each end beyond the side edges of the door member 26.

Also pivotally coupled to the underside of the door member 26 is a door prop or latch member 36. This latch member is preferably arcuate in shape along one edge 38 thereof and has a first notch 42 and a second notch 40 formed along the generally straight edge 44 thereof. The end 46 of the latch member 36 passes between first and second downwardly projecting ears 48 and 50 which are affixed to the underside of the door member 26. A pin 52 passes through these three parts and provides the aforementioned pivotal connection.

Extending inwardly from the side wall 20 of the housing is an abutment 54 which may take the form of a pin or small diameter rod. The notches 40 and 42 formed in the latch member 36 are adapted to cooperate with this abutment member 54. More specifically, when the notch 42 engages the abutment 54, the door is maintained in a second, open orientation. However, as will be later described, when the notch 40 in the latch member 36 cooperates with the abutment pin 54, the door member 26 is held in a first, closed orientation whereby the enclosure 12 is sealed in a substantially air-tight fashion.

Disposed within the confines of the housing 12 is a treadle or platform member 56 having a forward end 58 and a rear or remote end 60. The platform 56 is pivotally supported on a fulcrum 62 which extends between the side members 20 and 22 so that the treadle or platform 56 acts as a lever of the first class.

Figure 3:
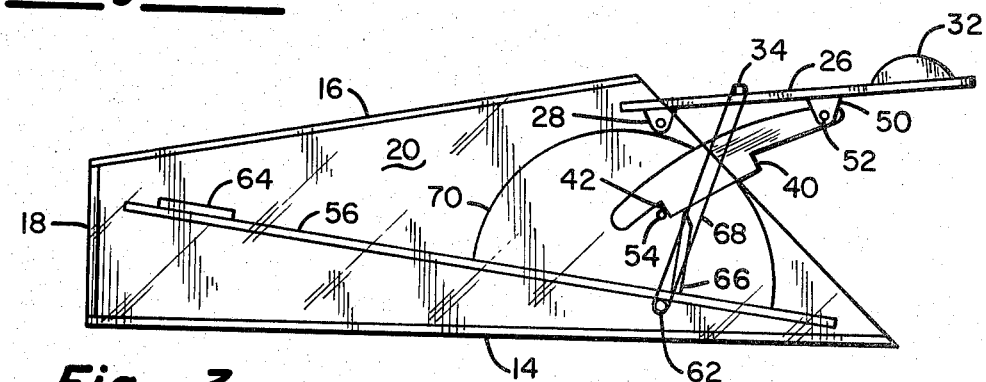
FIG. 3 is a side elevation of the preferred embodiment with the door member in its open orientation.
Figure 4:
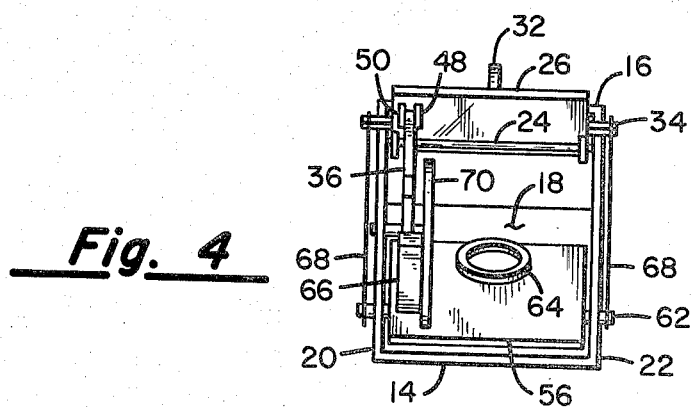
FIG. 4 is a front end view of the trap with the door in its open orientation.

Integrally formed proximate the rear end edge of the platform 56 is an annular ring 64 into which the bait may be placed. Also fixedly attached to the front end of the treadle member 56 is a trip element 66 which comprises a generally rectangular plate secured at one edge to the treadle member 56 just forward of the fulcrum 62 and which extends upwardly therefrom at generally a right angle. Also affixed to the treadle member 56 proximate the upwardly extending trip element 66 is a circular segment 70 which may be glued or otherwise attached to the treadle so as to extend upwardly therefrom. The upper edge of the trip member 66 is beveled with the apex extending to approximately the same elevation as the abutment member 54. As is shown in FIGS. 1, 3 and 4, when the door is propped in its open orientation, the upper edge of the trip member 66 abuts the straight segment of the latch 36 which lies between the notches 40 and 42.

The fulcrum 62 extends outwardly on each side of the trap 10 and forms a projection about which a resilient member such as the elastic band 68 may be wrapped. The band also passes around the outwardly extending edges of the bar 34 which is affixed to the upper surface of the door member 26. Thus, the resilient means 68 acts to normally urge the door member 26 to its closed orientation.

It operates as the animal, such as a small rodent, approaches the trap and peers inside, the prismoidal shape of the housing 12 is believed to provide an illusion of depth which seems to enhance the probability that the animal will enter into the trap. This observation is based upon rather extensive trials and comparisons with known prior art arrangements. As the animal progresses along the platform 56 so as to reach the ring 64 in which the bait is contained, the weight of the animal causes the rearward end of the platform to rotate downward towards the bottom member 14 and in doing so, the trip 66 is raised upwardly to move the latch member 36 so that the notch 42 no longer engages the abutment pin 54. At this point, the resilient means 68 causes the door 26 to snap closed as is illustrated in the side view of FIG. 2. In this orientation, the notch 40 in the latch member 36 engages the abutment pin 54 and prevents the door member 26 from being reopened. The arcuate plate 70 being located immediately adjacent to the trip element 66 on the treadle 56 prevents the animal's body from interfering with the proper operation of the trip and latch and insures that the latch will operate in its intended fashion.

Because of the tight seal maintained between the door member 26 and the door opening, the animal will rather quickly use up available oxygen and will die through a process called hypercapnia wherein the available oxygen is replaced by the animal's own carbon dioxide.

Figure 2:
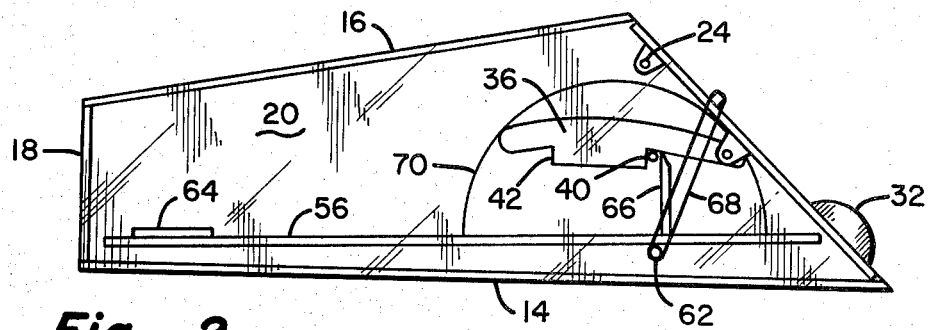
FIG. 2 is a side elevation of the preferred embodiment with the door in its closed orientation.

In order to empty the trap once the animal has expired, the operator inverts the trap 10 from the position shown in FIGS. 1 through 3 such that the latch 36 rotates under the force of gravity so that the notch 40 no longer engages the abutment pin 54. The operator next brings the trap to a vertical position with the door opening pointing downward. The door may now be opened by grasping the handle member 32 between the thumb and forefinger such that the dead animal may fall out of the trap without having to touch it.

To reset the trap, then, the operator tips the trap 10 so that the platform member 56 will have its rearmost end rotated to the point where the trip member 66 is out of contact with the abutment pin 54 which thereby allows engagement between the notch 42 on the latch member 36 and the abutment pin 54. Once the trap is thus set, it may be gently set down in a suspected area to avoid accidental tripping.

The housing 12 is preferably formed by injection molding of a suitable plastic. Similarly, the door member 26 and the latch 36 as well as the treadle or platform 56 may be also fabricated from a suitable plastic. The platform 56 is designed to be removable in that the downwardly depending ears which mate with the fulcrum 62 are adapted to snap about the fulcrum. As such, the platform member 56 may be removed for applying the bait. Alternatively, a long spatula or knife may be used to deposit a suitable bait within the annular ring 64.

The trap is very easy to clean in that a detergent solution may be poured into the open end and the cover closed. By shaking the detergent solution vigorously, the interior of the trap is rendered sanitary.

One desiring to trap small animals and keep them alive may utilize this trap, but should drill a number of small holes in the housing to allow air into the chamber.

It can be seen, then, that there has been described an improved animal trap. Various alternations and modifications may be envisioned by those skilled in the art. Hence, the scope of the invention should be determined from the following claims.

What is claimed is:

1. An animal trap, comprising:
   (a) a housing having a generally rectangular bottom member of a first predetermined length, a generally rectangular top member of a second predetermined length less than said first predetermined length, a rectangular end member extending perpendicularly from one end edge of said bottom member and joining said top member at a corresponding end edge thereof and first and second parallel and spaced apart irregularly shaped, four sided, polygonal, side members joining said bottom, top and end member along opposed edges thereof so that said top member slopes toward said bottom member, said housing having a door opening extending obliquely between the other end edges of said bottom and top members and conforming to an open edge of said polygonal side members;
   (b) a door member pivotally secured between said side members of said housing to completely seal said door opening in a substantially air-tight fashion when in a first orientation and to permit entry of an animal into said housing when in a second orientation;
   (c) resilient means coupled between said door member and said side members of said housing for normally urging said door member to said first orientation;
   (d) an abutment extending inwardly of said housing from one of said side members;
   (e) a latch member pivotally secured to said door and having first and second abutment engaging notches located at spaced apart locations along its length such that when said first notch engages said abutment, said door is held in said second orientation and when said second notch engages said abutment, said door is positively held in said first orientation;
   (f) an elongated platform having first and second ends disposed within said housing with said first end proximate said door opening near said bottom member, the platform being removably attached to a pivot member located intermediate said first and second ends of said platform and having a bait receiving area proximate said second end; and
   (g) a generally rectangular trip member having a first end edge attached to said platform between said pivot and said first end of said platform and extending generally perpendicularly therefrom and having a second end edge adapted to engage said latch member when said second end of said platform member is rotated toward said bottom member for releasing said first notch from engagement with said abutment and allowing said resilient means to urge said door member into said first orientation with said second notch engaging said abutment, said second end edge of said trip member preventing engagement between said first notch of said latch member and said abutment when said second end of said platform is in its rotated position toward said bottom member.

2. Apparatus as in claim 1 wherein said second end of said platform member slopes towards but terminates short of said corresponding end edge of said top member by a predetermined distance when said first notch in said latch member engages said abutment.

3. Apparatus as in claim 1 wherein said latch member comprises a flat plate member having a pivot point at one end thereof adapted to be pivotally attached to said door member, said first and second notches extending inwardly from one edge thereof.

4. Apparatus as in claim 1 and further including a vertically extending arcuate plate affixed to said platform proximate said trip member for preventing the animal entering the trap from interfering with coaction between said trip member and said latch member.

* * * * *